US005523157A

United States Patent [19]

Sasaki et al.

[11] Patent Number: 5,523,157

[45] Date of Patent: Jun. 4, 1996

[54] DISPERSION PARTICLES FOR FLUID HAVING MAGNETIC AND ELECTRORHEOLOGICAL EFFECTS

[75] Inventors: Makoto Sasaki; Katsuhiko Haji, both of Yokohama, Japan

[73] Assignee: Nippon Oil Company, Ltd., Tokyo, Japan

[21] Appl. No.: 308,408

[22] Filed: Sep. 19, 1994

[30] Foreign Application Priority Data

Sep. 21, 1993 [JP] Japan .................................... 5-257838

[51] Int. Cl.[6] ........................................ B32B 5/16

[52] U.S. Cl. .......................... 428/403; 428/407; 428/689; 428/702; 428/900

[58] Field of Search .................................... 428/403, 407, 428/900, 689, 702; 252/62.51, 62.56, 73, 74, 75

[56] References Cited

U.S. PATENT DOCUMENTS

| | | | |
|---|---|---|---|
| 2,661,596 | 12/1953 | Winslow | 60/326 |
| 3,047,507 | 7/1962 | Winslow | 252/75 |
| 3,535,245 | 10/1970 | Lindquist | 428/403 X |
| 4,917,952 | 4/1990 | Katamoto et al. | 428/403 |
| 4,992,190 | 2/1991 | Shtarkman | 252/62.51 R |
| 5,137,783 | 8/1992 | Tanihara et al. | 428/407 |

FOREIGN PATENT DOCUMENTS

| | | |
|---|---|---|
| 0343934 | 11/1989 | European Pat. Off. . |
| 0394049 | 10/1990 | European Pat. Off. . |
| 0579229 | 1/1994 | European Pat. Off. . |
| 51-33783 | 3/1976 | Japan . |
| 51-44579 | 4/1976 | Japan . |
| 53-93186 | 8/1978 | Japan . |
| 58-179259 | 10/1983 | Japan . |
| 61-44998 | 3/1986 | Japan . |
| 62-95397 | 5/1987 | Japan . |
| 4261496 | 9/1992 | Japan . |
| 1076754 | 9/1967 | United Kingdom . |
| WO90/00583 | 1/1990 | WIPO . |

OTHER PUBLICATIONS

Handbook of Chemistry and Physics, 69th edition, 1988–1989, pp. B–206 and F–123.

*Primary Examiner*—D. S. Nakarani
*Assistant Examiner*—H. Thi Le
*Attorney, Agent, or Firm*—Armstrong, Westerman, Hattori, McLeland & Naughton

[57] ABSTRACT

Dispersion particles for a fluid having magnetic and electrorheological effects simultaneously, which comprise conductive ferromagnetic particles whose surfaces are coated with an electrically insulating layer and a fluid used the same. The present fluid has a larger torque induced upon application of both a magnetic field and an electric field than that in a fluid having only magnetic or electrorheological effects and higher response speed than that in a fluid having only magnetic. Furthermore, in the present fluid current difficultly passes.

3 Claims, No Drawings

DISPERSION PARTICLES FOR FLUID HAVING MAGNETIC AND ELECTRORHEOLOGICAL EFFECTS

BACKGROUND OF THE INVENTION

1) Field of the Invention

The present invention relates to dispersion particles for a fluid having a characteristic of a magnetic fluid susceptible to a magnetic field and a characteristic of an electrorheological fluid whose viscosity can increase with an applied electric field simultaneously and a fluid used the same, and particularly to a fluid capable of outputting a large force at a high response speed.

2) Prior Art

A magnetic fluid is a colloidal solution, which is a uniform dispersion of ferromagnetic particles in a solvent, and, when a magnet is provided near the magnetic fluid, the entire fluid is attracted towards the magnet and behaves as if the entire fluid is apparently charged with a magnetism.

Furthermore, the magnetic fluid has such a characteristic that a large force can be induced in the magnetic fluid with an applied magnetic field. By virtue of this characteristic, the magnetic fluid is utilized for rotating shaft sealing, and further application to dampers, actuators, gravity separation, ink jet printers, etc. can be expected.

A typical process for preparing a magnetic fluid is a chemical coprecipitation process disclosed in JP-A 51-44579, where an aqueous slurry of magnetic prepared from an aqueous solution of ferrous sulfate and an aqueous solution of ferric sulfate is admixed with a surfactant, followed by water washing, drying and dispersion into an organic solvent, thereby preparing a magnetic fluid.

An electrorheological fluid, on the other hand, is a suspension of inorganic or polymeric particles in an electrically insulating liquid, whose viscosity can be rapidly and reversibly changed from a liquid state to a plastic state or to a solid state or vice versa upon application of an electric field thereto. A high response speed is one of the characteristics.

As dispersion particles, those whose surfaces are readily depolarizable under an electric field are usually used. For example, as inorganic dispersion particles, silica is disclosed in U.S. Pat. No. 3,047,507, British Patent No. 1,076,754 and JP-A 61-44998, and zeolite is disclosed in JP-A 62-95397. As polymeric dispersion particles, arginic acid, glucose having carboxyl groups and glucose having sulfone groups are disclosed in JP-A 51-33783; polyacrylic acid cross-linked with divinylbenzene is disclosed in JP-A 53-3186; and resol-type phenol resin is disclosed in JP-A 58-179259.

As an electrically insulating liquid, mineral oil, silicone oil, fluorohydrocarbon-based oil, halogenated aromatic oil, etc. are known.

It is preferable from the viewpoint of higher electrorheological effect that water is adsorbed on the surfaces of dispersion particles. In most cases, the electrorheological fluid contains a small amount of water.

Mechanism of increase in the viscosity of an electrorheological fluid with an applied electric field can be clarified on the basis of the electric double layer theory. That is, an electric double layer is formed on the surfaces of dispersion particles of an electrorheological fluid, and when there is no application of an electric field, dispersion particles repulse one another on the surfaces and are never in a particle alignment structure. When an electric field is applied thereto, on the other hand, an electrical deviation occurs in the electrical double layers on the surfaces dispersion particles, and the dispersion particles are electrostatically aligned to one another, thereby forming bridges of dispersion particles. Thus, the viscosity of the fluid is increased, and sometimes the fluid is solidified. The water contained in the fluid can promote formation of the electrical double layer.

Application of the electrorheological fluid to engine mounts, shock absorbers, clutches, ink jet printers, etc. can be expected.

However, the magnetic fluid still has such problems that neither high permeability nor higher response speed as aims to a quick response is obtainable. When it is used as a seal, a low sealability is also one of the problems. These problems are obstacles to practical applications. The electrorheological fluid still has such a problem that the torque induced upon application of an electrical field is so small that no larger force can be obtained.

SUMMARY OF THE INVENTION

An object of the present invention is to provide dispersion particles for a fluid capable of producing a large torque at a high response speed and a high sealability and a fluid used the same.

As a result of extensive studies for a fluid having magnetic and electrorheological effects simultaneously, the inventors have found that as dispersion particles the use of conductive ferromagnetic particles whose surfaces are coated with an electrically insulating layer can attain the object, and have established the present invention.

That is, the present invention provides dispersion particles for a fluid having magnetic and electrorheological effects simultaneously, which comprise conductive ferromagnetic particles whose surfaces are coated with an electrically insulating layer.

Moreover, the present invention provides a fluid having magnetic and electrorheological effects simultaneously, which comprises 1 to 90% by weight of dispersion particles whose surfaces are coated with an electrically insulating layer and 99 to 10% by weight of an electrically insulating solvent.

DETAILED DESCRIPTION OF THE INVENTION

The present invention will be described in detail below.

The term "magnetic" used herein means "a property susceptible to a magnetic field", for example, "a property attractive to a magnet"

Moreover, the term "electrorheological effects" used therein means "effects in which an apparent viscosity increases upon application of an electric field", generally, "effects which an electrorheological fluid provides".

The term "conductive ferromagnetic particles" used herein means "ferromagnetic particles having preferably an electrical resistance $10^5$ Ωcm or below, more preferably $10^3$ Ωcm or below". The conductive ferromagnetic particles include magnetic particles of metals such as iron, cobalt, nickel, permalloy, etc; magnetic particles of oxides such as ferrite, magnetite, etc, ; particles of iron nitride, etc, and furthermore compounds of rare earth metals such as samarium, neodymium, cerium, etc.

As methods for coating conductive ferromagnetic particles with an electrically insulating layer, for example, known methods for coating including solution or powder coating, vapor deposition, surface polymerization, surface reaction, etc., are applied.

The electrically insulating layer for use in the present invention includes synthetic high molecular compounds such as polyethylene, polystyrene, polymethylacrylate, etc., natural high molecular compounds such as wax, asphalt, drying oil varnish, etc., and inorganic compounds such as silica, alumina, rutile, titanium oxide, etc.

In order to increase an adhesive strength between conductive ferromagnetic dispersion particles and an electrically insulating layer, the surfaces the conductive ferromagnetic dispersion particles may be subjected to etching treatment, coupling agent treatment or anchorcoat treatment.

The method also which comprises beginning polymerization of a monomer able to form an electrically insulating layer on surfaces of conductive ferromagnetic dispersion particles to chemically bond the conductive ferromagnetic dispersion particles with an electrically insulating layer is effective.

Moreover, the method also which comprises forming an insulating oxidized layer by oxidation of conductive ferromagnetic dispersion particles or an insulating nitrided layer by nitridation of conductive ferromagnetic dispersion particles is simple and preferable.

The dispersion particles may have a three layered structure wherein non-ferromagnetic particles such as organic solid particles exist in the interior of conductive ferromagnetic particles. This case has an advantage that dispersion stability further increases since a specific gravity of the dispersion particles is close to that of a solvent.

The electrical resistance of the electrically insulating layer is preferably $10^8$ Ωcm or above. Below $10^8$ Ωcm a short circuit occurs owing to easy current passage upon application of an electric field. The thickness of the electrically insulating layer, which depends on the kind or the size of conductive ferromagnetic dispersion particles, is in the range of 0.001 to 10 μm, preferably 0.05 to 3 μm, more preferably 0.1 to 1 μm. Below 0.001 μm, a short circuit easily occurs owing to dielectric breakdown of the electrically insulating layer, whereas above 10 μm it is not preferable since electrorheological effects deteriorate.

The dispersion particles in the present invention have preferably a particle size of 0.003 to 200 μm. Particularly, hard magnetic particle have preferably a particle size of 0.003 to 0.5 μm and soft magnetic particles have preferably a particle size 0.1 to 200 μm. More particularly, in case of obtaining a very large force, soft magnetic particles having a particles size of 1 to 100 μm are preferable. When the particle size is below 0.003 μm, the particles have no magnetic property, whereas above 200 μm dispersion in a fluid extremely deteriorates.

The electrically insulating solvent for use in the present invention is a liquid having preferably a boiling point of 150° to 700° C. (atmospheric pressure), more preferably 200° to 650° C. (atmospheric pressure) and preferably a viscosity of 1 to 500 cSt at 40° C., more preferably 5 to 300 cSt at 40° C. The example of the electrically insulating solvent includes hydrocarbon solvents such as mineral oil, alkylnaphthalene, poly α-olefin, etc.,; ester oils such as butyl phthalate, butyl sebatate, etc.,; ether oils such as oligophenylene oxide, etc.; silicone oils; fluorocarbon oils, etc.

A mixing proportion of the dispersion particles to the electrically insulating solvent is 1–90 % by weight to 99–10% by weight, preferably 5–60% by weight to 95–40% by weight. When a proportion of the electrically insulating solvent is less than 10% by weight, a viscosity of the fluid increases, thereby deteriorating a function as a fluid, whereas above 99% by weight neither magnetic nor electrorheological effects can be obtained.

In the present invention, additives such as a surfactant may be added to the fluid within such a range as not to deteriorate the effect of the present invention.

As methods for application of a magnetic field and an electric field in the present invention, both magnetic field and electric field may be simultaneously in constant intensities or while changing the intensities in accordance with the changes in the necessary torque. Moreover, one of the magnetic field and the electric field may be continuously applied in a constant intensity while changing the applied intensity of other field in accordance with the changes in the necessary torque.

The fluid according to the present invention can be applied to engine mounts, shock-damping apparatuses such as shock absorbers, etc., clutches, torque converters, brake systems, valves, dampers, suspensions, actuators, vibrators, ink jet printers, seals, gravity separation, bearings, polishing, packing, control valves, vibration preventing materials, etc.

PREFERRED EMBODIMENTS OF THE INVENTION

The present invention will be described in detail below, referring to Examples, which will be never limitative of the present invention.

SYNTHESIS EXAMPLE 1

40 g of permalloy powders having an average particle size of 10 μm and an electrical resistance of $2.1 \times 10^{-4}$ Ωcm was surface-treated with 0.4 g of γ-methacryloxypropyltrimethoxysilane and then 7 g of methylmethacrylate, 0.03 g of azobisisobutylnitrile as an initiator and 100 g of 0.01 wt. % aqueous solution of polyvinylalcohol were mixed therein and suspension polymerization was conducted at 70° C. to obtain particles (I) whose surfaces were insulating-coated with polymethylmethacrylate.

The electrical resistance of the insulating-coated particles (I) was $6.3\times10^{11}$ Ωcm. It was found by X-ray photoelectron spectrometry that the insulating-coated particles (I) were coated with polymethylmethacrylate up to 1 μm from the surfaces.

SYNTHESIS EXAMPLE 2

Iron powders having an average particle size of 0.4 μm and an electrical resistance of $1.8\times10^{-5}$ Ωcm were placed in air for one week to obtain particles (II) on whose surfaces an insulating layer of iron oxide was formed.

The electrical resistance of the insulating-coated particles (II) was $1.3\times10^{10}$ Ωcm. It was found by X-ray photoelectron spectrometry that the insulating-coated particles (II) were coated with an oxide layer up to 0.1 μm from the surfaces.

EXAMPLE 1

30 g of the insulating-coated particles (I) obtained in Synthesis Example 1 was dispersed in 70 g of silicone oil KF-96 (trademark of a product made by Shinetsu Silicone K.K., Japan) having a viscosity of 20 cSt at 25° C. to prepare a fluid (A). The fluid (A) had a saturation magnetization of 410 Gauss and it was found that the fluid (A) was attracted to a magnet.

Then, a high voltage applicable test apparatus provided with two electrodes each having an area of 400 $mm^2$ and being faced to each other at a clearance of 1 mm, and with an electromagnet on both electrodes was placed sideways, and then the fluid (A) was filled into the cell to determine magnetic and electrorheological characteristics, while determining torques by changing the position of the upper electrode in the horizontal direction. The response speed was determined with an oscillograph by measuring a delay in a torque following application of either magnetic or electric field or both.

The fluid (A) had a torque of 21 gf.cm under no application of both a magnetic field and an electric field.

When only a magnetic field of 1,500 Oe was applied to the fluid (A), the torque was 178 gf.cm and the response speed was 0.39 sec.

When only an electric field of 3 kV/mm was applied, the torque was 191 gf.cm and the response speed was 0.02 sec. Thus, it was found that the fluid (A) had both magnetic and electrorheological effects.

When both a magnetic field of 1,500 Oe and an electric field of 3 kV/mm were applied to the fluid (A) at the same time, the torque was 461 gf.cm and the response speed was 0.06 sec.

EXAMPLE 2

A fluid (B) was prepared in the same manner as in Example 1 using the insulating-coated particles (II) obtained in Synthesis Example 2. The fluid (B) had a saturation magnetization of 380 Gauss, and it was found that the fluid (B) was attracted to a magnet.

Then, magnetic and electrorheological characteristics of the fluid (B) were investigated in the same manner as in Example 1.

The fluid (B) had a torque of 28 gf.cm under no application of both a magnetic field and an electric field.

When only a magnetic field of 1,500 Oe was applied to the fluid (B), the torque was 159 gf.cm and the response speed was 0.30 sec.

When only an electric field of 3 kV/mm was applied to the fluid (B), the torque was 176 gf.cm and the response speed was 0.02 sec. Thus, it was found that the fluid (B) had both magnetic and electrorheological effects.

Then, when both a magnetic field of 1,500 Oe and an electric field of 3 kV/mm were applied to the fluid (B) at the same time, the torque was 407 gf.cm and the response speed was 0.06 sec.

Comparative Example 1

30 g of silica particles having a particle size of 12 μm was dispersed in 70 g of silicone oil KF-96 (trademark of a product made by Shinetsu Silicone K.K., Japan) having a viscosity of 20 cSt at 25° C. and 1 g of water was further added thereto to prepare a fluid (C).

Then, magnetic and electrorheological characteristics of the fluid (C) were investigated in the same manner as in Example 1.

The fluid (C) had a torque of 18 gf.cm under no application of both a magnetic field and an electric field.

When only a magnetic field of 1,500 Oe was applied to the fluid (C), there was no change in the torque, and the fluid (C) was not attracted to a magnet and thus was not susceptible to a magnetic field at all.

When only an electric field of 3 kV/mm was applied to the fluid (C), the torque was 239 gf.cm and the response speed was 0.02 sec. Thus, it was found that the fluid (C) had electrorheological effects.

Then, when both a magnetic field of 1,500 Oe and an electric field of 3 kV/mm were applied to the fluid (C) at the same time, the same torque and the response time were obtained as those obtained when only an electric field was applied thereto.

Comparative Example 2

30 g of permalloy particles used in Synthesis Example 1 was dispersed in 70 g of silicone oil KF-96 (trademark of a product made by Shinetsu Silicone K.K., Japan) having a viscosity of 20 cSt at 25° C. and 1 g of water was further added thereto to prepare a fluid (D). The fluid (D) had a saturation magnetization of 420 Gauss, and it was found that the fluid (D) was attracted to a magnet.

Then, magnet and electrorheological characteristics were investigated in the same manner as in Example 1.

The fluid (D) had a torque of 20 gf.cm under no application of both a magnetic field and an electric field.

When only a magnetic field of 1,500 Oe was applied to the fluid (D), the torque was 198 gf.cm and the response speed was 0.41 sec.

Only an electric field of 3 kV/mm was applied to the fluid (D), but when the electric field was above 0.5 kV/mm, too much current was passed to cause a short circuit. Thus, an electric field of above 0.5 kV/mm could not be applied to the fluid (D). At 0.5 kV/mm, the torque almost never increased.

Furthermore, also when both a magnetic field and an electric field applied to the fluid (D), two much current was passed to cause a short circuit and consequently a voltage could not be applied to the fluid (D).

The fluid having magnetic and electrorheological effects simultaneously used dispersion particles according to the present invention has a larger torque induced upon application of both a magnetic field and an electric field than that in a fluid having only magnetic or electrorheological effects and a higher response speed than that in a fluid having only magnetic. Furthermore, it is clear that in the present fluid current difficultly passes.

What is claimed is:

1. Dispersion particles for a fluid having magnetic and electrorheological effects simultaneously, which comprise conductive ferromagnetic particles having a particle size in the range of 0.003 to 200 μm whose surfaces are coated with an electrically insulating layer having an electrical resistance of at least $10^8$ Ωcm and a thickness in the range of 0.001 to 10 μm.

2. The dispersion particles according to claim 1, wherein the conductive ferromagnetic particles have an electrical resistance of $10^5$ Ωcm or below.

3. The dispersion particles according to claim 1, wherein the electrically insulating layer is one selected from the group consisting of poly(methyl methacrylate), iron oxide, silica and titanium oxide.

* * * * *